(12) United States Patent
Weinans et al.

(10) Patent No.: US 7,925,214 B2
(45) Date of Patent: Apr. 12, 2011

(54) DISTRIBUTED BLUETOOTH SYSTEM

(75) Inventors: Erwin Weinans, Klijndik (NL); Barteld Trip, Emmen (NL); Tjapko Uildriks, Anderen (NL)

(73) Assignee: Sony Ericsson Mobile Communications AB, Lund (SE)

( * ) Notice: Subject to any disclaimer, the term of this patent is extended or adjusted under 35 U.S.C. 154(b) by 775 days.

(21) Appl. No.: 11/348,601

(22) Filed: Feb. 7, 2006

(65) Prior Publication Data

US 2007/0141987 A1 Jun. 21, 2007

Related U.S. Application Data

(60) Provisional application No. 60/750,981, filed on Dec. 16, 2005.

(51) Int. Cl.
*H04B 7/00* (2006.01)
(52) U.S. Cl. ............... 455/41.2; 455/41.1; 455/11.1
(58) Field of Classification Search ............ 455/41.2, 455/41.3, 450, 451, 74, 561, 11.1, 41.1, 414.1, 455/426.1; 370/338, 346, 322, 252, 328, 370/390; 375/322
See application file for complete search history.

(56) References Cited

U.S. PATENT DOCUMENTS

| | | | |
|---|---|---|---|
| 6,275,500 B1 * | 8/2001 | Callaway et al. | 370/449 |
| 6,683,886 B1 * | 1/2004 | van der Tuijn et al. | 370/458 |
| 6,751,200 B1 * | 6/2004 | Larsson et al. | 370/255 |
| 6,795,668 B1 * | 9/2004 | Nishiwaki | 399/120 |
| 6,901,057 B2 | 5/2005 | Rune et al. | |
| 6,941,114 B1 * | 9/2005 | Kuo et al. | 455/74 |
| 6,968,153 B1 * | 11/2005 | Heinonen et al. | 455/11.1 |
| 7,031,945 B1 * | 4/2006 | Donner | 705/64 |
| 7,165,171 B2 * | 1/2007 | Zhang et al. | 713/1 |
| 7,181,214 B1 | 2/2007 | White | |
| 7,242,677 B2 * | 7/2007 | Hong | 370/346 |

(Continued)

FOREIGN PATENT DOCUMENTS

DE 20313973 U1 12/2003

(Continued)

OTHER PUBLICATIONS

Jaap Haartsen, "Bluetooth—The universal radio interface for ad hoc, wireless connectivity", Ericsson Review No. 3, 1998, pp. 110-117.
International Search Report for corresponding International Application No. PCT/EP2006/008928 mailed Dec. 19, 2006.

*Primary Examiner* — Nguyen Vo
*Assistant Examiner* — Ganiyu Hanidu
(74) *Attorney, Agent, or Firm* — Renner, Otto, Boisselle & Sklar, LLP

(57) ABSTRACT

Bluetooth standard provides the applications with different profiles which allow for example only a specific number of devices operable in one network using the same profile. Without changing the Bluetooth standards the described apparatus and method provide a solution to allow wireless devices to receive data addressed to other wireless devices. Therefore a wireless electronic apparatus for Bluetooth communication receives data specifically addressed to said wireless electronic apparatus and to a wireless electronic device for Bluetooth communication, said wireless electronic device being operable to receive data specifically addressed to said wireless electronic device, said wireless electronic apparatus being different from said wireless electronic device. This can be realised for example by a wrist display which can pickup the electromagnetic waves containing the audio signals sent to the headset. Afterwards the properties can be displayed on the wrist to inform the user about the status of the audio signals or the cell phone transmitting the audio signals.

11 Claims, 3 Drawing Sheets

U.S. PATENT DOCUMENTS

| | | | |
|---|---|---|---|
| 7,336,924 B2 * | 2/2008 | Ami et al. | 455/41.2 |
| 7,408,929 B2 | 8/2008 | Adachi et al. | |
| 7,430,217 B2 * | 9/2008 | Kuhl | 370/455 |
| 2001/0039181 A1 * | 11/2001 | Spratt | 455/11.1 |
| 2002/0048269 A1 * | 4/2002 | Hong et al. | 370/389 |
| 2002/0065045 A1 | 5/2002 | Kim | |
| 2003/0012219 A1 * | 1/2003 | Joo | 370/449 |
| 2003/0185186 A1 * | 10/2003 | Tsutsumi et al. | 370/338 |
| 2004/0147223 A1 * | 7/2004 | Cho | 455/41.2 |
| 2004/0209569 A1 * | 10/2004 | Heinonen et al. | 455/41.2 |
| 2004/0253984 A1 * | 12/2004 | Csapo et al. | 455/561 |

FOREIGN PATENT DOCUMENTS

| | | |
|---|---|---|
| EP | 1 185 012 A2 | 3/2002 |
| EP | 1223715 A1 | 7/2002 |
| JP | 2003-174452 A | 6/2003 |
| JP | 2005-510153 A | 4/2005 |
| KR | 10-2005-0007810 A | 10/2003 |
| RU | 2003 127 839 A | 2/2002 |
| RU | 2260918 C2 | 9/2005 |
| WO | 02/07389 A1 | 1/2002 |
| WO | 02/086725 A1 | 10/2002 |

* cited by examiner

DISTRIBUTED BLUETOOTH SYSTEM

CROSS REFERENCE TO RELATED APPLICATION

This application claims priority under 35 U.S.C. §119 to U.S. Provisional Application No. 60/750,981, filed Dec. 16, 2005, the entire disclosure of which is incorporated herein by reference.

TECHNICAL FIELD OF THE INVENTION

The present invention relates to the field of wireless communication and in particularly to master-slave and slave-slave relations in Bluetooth communication systems.

DESCRIPTION OF THE RELATED ART

Bluetooth is a standard that fairly replaces the IrDA (Infrared Data Association) as an interface for wireless communication between different electronic devices.

Bluetooth operates in the unlicensed ISM band that is also used by other devices such as 802.11 networks, baby monitors, garage door openers, microwave ovens, etc.; therefore Bluetooth uses Frequency Hop Spread Spectrum (FHSS) to avoid any interference. A Bluetooth channel is divided into time slots each 625 micro seconds in length. The devices hop through these time slots making 1600 hops per second. This trades bandwidth efficiency for reliability, integrity and security. Bluetooth radios operate in the unlicensed ISM band at 2.4 Gigahertz using 79 channels between 2.402 GHz to 2.480 GHz (23 channels in some countries). The range for Bluetooth communication is 0-30 feet (10 meters) with a power consumption of 0 dBm (1 mW). This distance can be increased to 100 meters by amplifying the power to 20 dBm.

Bluetooth supports two kinds of links: Asynchronous Connectionless (ACL) links for data transmission and Synchronous Connection oriented (SCO) links for audio/voice transmission. The gross Bluetooth data rate is 1 Mbps while the maximum effective rate on an asymmetric ACL link is 721 Kbps in either direction and 57.6 Kbps in the return direction. A symmetric ACL link allows data rates of 432.6 Kbps. Bluetooth also supports up to three 64 Kbps SCO channels per device. These channels are guaranteed bandwidth for transmission.

This section describes the basic procedures to be followed by two or more Bluetooth devices to start a connection between each other. The device would automatically carry out the following steps, (except perhaps for the authentication step if the device has come to or joined the environment for the first time):

Inquiry: The device on reaching a new environment would automatically initiate an inquiry to find out what access points are within its range. This will result in the following events: All nearby access points respond with their addresses and then the device picks out one of the responding devices.

Paging: The device will invoke a baseband procedure called paging. This results in synchronization of the device with the access point, in terms of its clock offset and phase in the frequency hop, among other required initializations.

Link establishment: The Link Manager Protocol (LMP) will now establish a link with the access point. Depending on the application an Asynchronous Wireless (ACL) link or a Synchronous Connection (SCO) will be used. Various setup steps will be carried out as described below.

Service Discovery: The LMP will use the SDP (Service Discovery Protocol) to discover what services are available from the access point. When the service is available, the application can proceed further. The information regarding the other services offered at the access point may be presented to the user.

L2CAP (Logical Link Control and Adaptation Protocol) channel: With information obtained from SDP, the device will create an L2CAP channel to the access point. This may be directly used by the application or another protocol like RFCOMM may be run over it.

RFCOMM channel (RFCOMM comes from a Radio Frequency (RF)-oriented emulation of the serial COM ports on a PC and emulates full 9-pin RS-232 serial communication over an L2CAP channel): Depending on the need of the application an RFCOMM or other channel (in case of other) will be created over the L2CAP channel. This feature allows existing applications developed for serial ports to run without modification over Bluetooth platforms.

Security: If the access point restricts its access to a particular set of users or otherwise offers secure mode communications to people having some prior registration with it, then at this stage, the access point will send a security request for "pairing". This will be successful if the user knows the correct PIN code to access the service. Note that the PIN is not transmitted over the wireless channel but another key generated from it is used, so that the PIN is difficult to compromise. Encryption will be invoked if secure mode is used.

PPP: If a PPP link is used over serial modem as in dial up networking, the same application will now be able to run PPP over RFCOMM (which emulates the serial port).

Network Protocols: The network protocols like TCP/IP, IPX, Appletalk can now send and receive data over the link.

In the above procedure, user interaction is required only for the security to be implemented. The remaining steps are automatic.

Today Bluetooth enabled mobile phones can be used in combination with a Bluetooth enabled headset. For this use case, Bluetooth has defined two profiles comprising HSP (Headset Profile) and HFP (Handsfree Profile). The profiles define the interaction between two Bluetooth enabled products. Everything in these profile specifications is limiting the usage to two devices with both their own role.

One of the devices is performing according to the AG (Audio Gateway) role and the other device is performing to the HF (Handsfree) role. During connections, the HF device receives the audio as a stream and call (and phone) status related information as data packets.

FIG. 1 shows a schematic view of an example of a state of the art Bluetooth network 6 comprising at least three radio devices 1, 2, 3 connected via wireless connections 4, 5. These wireless connections 4 and 5 are established by electromagnetic waves. The network is formed by Bluetooth communication or radio devices and connections, whereby the Bluetooth devices may be embodied as portable and mobile computing devices such as Personal Computers (PC), Personal Digital Assistants (PDA), peripherals, cell phones, pagers, consumer electronics, etc.

In this example the Bluetooth communication within the network 6 occurs between a master radio device 1 and at least two wireless electronic devices 2 and 3. More slave radio devices are possible but are not shown in the schematic view. The network 6 is also called piconet since two or more radio devices together form an ad-hoc network as above-mentioned which has one master device and one or more slaves. There may be up to seven active slaves at a time within a piconet. Thus, each active device within a piconet is identifiable by a 3-bit active device address. Inactive slaves in unconnected modes, not shown in the schematic view, may continue to reside within the piconet. A master is the only one that may initiate a Bluetooth communication link.

The master radio device 1 is operable to form a connection to the slave radio 2 and 3 via the wireless connection 4 and 5, respectively. In particular the wireless connections 4 and 5 comprise two channels, respectively, wherein the channels 41 and 51 transmit data from the master radio device 1 to the wireless electronic devices 2 and 3, respectively. Furthermore the other channels 42 and 52 send data from the wireless electronic devices 2 and 3 to the master radio device 1, respectively. Thus, it is clear that no direct connection is established between the wireless electronic devices 2 and 3 and therefore can communicate with each other.

Bluetooth radio devices are symmetric in that the same device may operate as a master and/or also as a slave. Once a link is established, the slave may request a master/slave switch to become the master. Slaves are not allowed to talk to each other directly. All communication occurs within the slave and the master. Slaves within a piconet must also synchronize their internal clocks and frequency hops with that of the master. Each piconet uses a different frequency hopping sequence. Radio devices use Time Division Multiplexing (TDM) and have each a 48-bit unique device address (BD_ADDR) that is fixed.

According to the document US 20020065045 A1 a method is provided of exchanging information received from a mobile communication system between Bluetooth units. Thus, the apparatus can establish a connection with other mobile communication systems and Bluetooth units concurrently and convert data into the specific and necessary formats.

Furthermore the aim of the invention of the document EP 1223715 A1 is to provide a wireless communication apparatus, method and system enabling peer-to-peer communication between the slave devices through rapid master-to-slave switching. This switching realises a quasi slave-to-slave communication. This is possible due to the unchanged frequency hopping sequence and unchanged active member addresses.

Furthermore the invention of the document U.S. Pat. No. 6,901,057 B2 relates to a method of forming ad hoc wireless networks, and more particularly, to forming wireless networks according to the Bluetooth specification and how a unit adapted to communicate according to the Bluetooth specification may best discover masters in existing piconets and be connected as a slave to those masters without having to use the master-slave switch.

SUMMARY

In view of the aforementioned shortcomings associated with conventional Bluetooth communication systems, there is a strong need in the art for a wireless electronic apparatus for Bluetooth communication operable to receive the data specifically addressed to another wireless electronic device.

Moreover, there is a strong need in the art to save power. Although Bluetooth communication is already an energy saving transmission possibility compared to other standards, there are still possibilities to save more energy.

The present invention relates to a wireless electronic apparatus for Bluetooth communication operable to receive data specifically addressed to said wireless electronic apparatus and to a wireless electronic device for Bluetooth communication. This wireless electronic device is operable to receive data specifically addressed to said wireless electronic device and is a different entity from said wireless electronic apparatus. The wireless electronic device and the wireless electronic apparatus could be similar or the same type of device or different types of devices.

Favourably the wireless electronic apparatus is operable to send data specifically addressed as said wireless electronic apparatus or as said wireless electronic device for Bluetooth communication.

Favourably a wireless electronic system for Bluetooth communication is operable to form a Bluetooth network with a radio device which is operable to transmit and/or receive specifically addressed data. This system comprises a wireless electronic device operable to receive and/or transmit specifically addressed data and a wireless electronic apparatus as above-mentioned.

Favourably the wireless electronic apparatus is operable to receive data specifically addressed to said wireless electronic device.

Favourably the wireless electronic apparatus is operable to transmit to and/or receive specifically addressed data from said radio device.

Favourably the wireless electronic apparatus is operable to transmit data specifically addressed as said wireless electronic device.

Favourably the wireless electronic device is operable to transmit and/or receive specifically addressed data to said radio device.

Favourably the wireless electronic device and the wireless electronic apparatus are operable to process data streams and/or data packets, respectively.

Favourably the wireless electronic device and the wireless electronic apparatus are spatially separated.

Favourably the wireless electronic apparatus is provided the device address code of the wireless electronic device during its manufacture and/or while the network is formed. Said device address code is operable for receiving data specifically addressed to the wireless electronic device.

The above-mentioned objects are also solved by a method for receiving data from the radio device by a wireless electronic apparatus for Bluetooth communication, said radio device being operable to transmit and/or receive data. The data is specifically addressed to a wireless electronic device for Bluetooth communication operable to receive data. Furthermore said wireless electronic apparatus is a different unit from said wireless electronic device.

Favourably the method comprises first an initialization step, wherein the wireless electronic device is operable to contact to the radio device via an active Bluetooth connection, whereby an active device address is given from the radio device to the wireless electronic device, said active device address being operable to allow the reception of specifically addressed data. Then said method secondly comprises an adaptation step, wherein the wireless electronic apparatus receives the active device address from or during the initialization step, and finally a reception step, wherein the wireless electronic apparatus receives data specifically addressed to the wireless electronic device.

The terms "wireless electronic device" and "wireless electronic apparatus" and "radio device", respectively, include any kind of portable or non-portable communication equipment adapted to communicate in a Bluetooth system, including but not limited to mobile radio terminals, mobile phones, pagers, communicators, electronic organisers, smartphones, mono or stereo ear phones, mono or stereo headsets, wristwatches, portable music players, etc. Further, the term "comprises/comprising" used herein is taken to specify the presence or addition of one or more other features, integers, steps, components or groups thereof.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF EMBODIMENT

Figure 2:
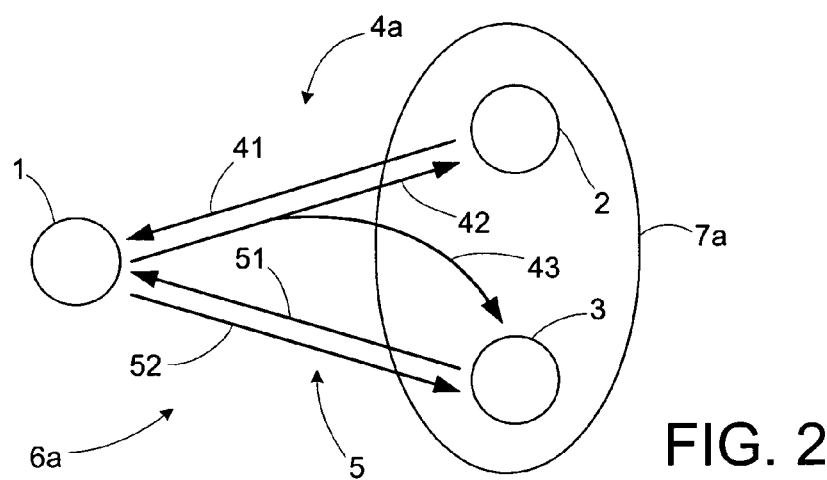
FIG. 2 shows a schematic view of a communication network comprising an embodiment of the present invention.

FIG. 2 shows a schematic view of a Bluetooth communication network 6a comprising a wireless electronic system 7a, a radio device 1 and the wireless connections 4a and 5. The wireless electronic system 7a is operable to form a connection with the radio device 1 and comprises the wireless electronic device 2 and the wireless electronic apparatus 3a, an embodiment of the present invention. The wireless electronic device 2 and the wireless electronic apparatus 3a are operable to process and/or output data and to connect with the radio device 1 via the wireless connections 4a and 5, respectively, which are established by electromagnetic waves.

The wireless electronic device 2 and the wireless electronic apparatus 3a are spatially separated and the network 6a is not limited to Bluetooth devices and connections but can be any transmission standards known to a skilled person. The radio device 1 is operable to transmit specifically addressed data to and/or receive data from the wireless electronic device 2 and the wireless electronic apparatus 3a. The wireless connection 4a comprises the channels 41, 42 and 43. The channel 41 is operable to send data from the wireless electronic device 2 to the radio device 1, while the channels 42 and 43 are operable to send data from the radio device 1 to the wireless electronic devices 2 and 3a, respectively. The channels 42 and 43 carry identical information. The wireless connection 5 comprises the channels 51 and 52. The channel 51 is operable to send data from the wireless electronic apparatus 3a to the radio device 1, while the channel 52 is operable to send data from the radio device 1 to the wireless electronic apparatus 3a. All channels are realized via transmission and/or reception of electromagnetic waves containing data.

Figure 1:
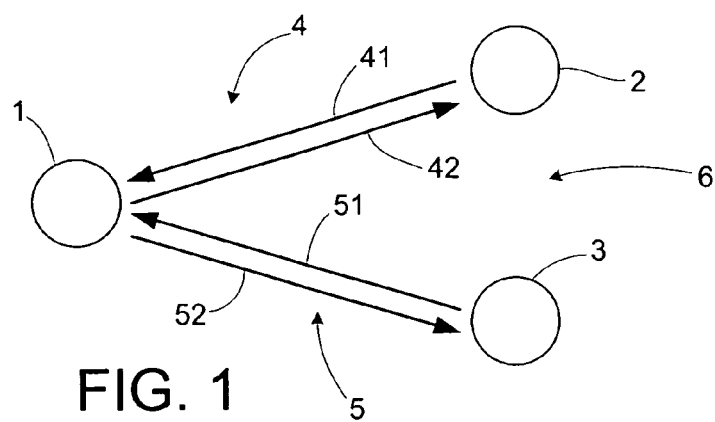
FIG. 1 shows a schematic view of an example of state of the art network.

According to the state of the art described in FIG. 1 a wireless electronic device normally comprises only two channels wherein one is operable for the reception and the other one is operable for the transmission of data, but not more channels. In this embodiment of the present invention the wireless electronic apparatus 3a is operable to send data via channel 51 and receive data via the channels 43 and/or 52, while the wireless electronic device 2 is operable to send data via channel 41 and receive data via channel 42. A second channel 43 the wireless electronic apparatus 3a for reception can be achieved for example by filtering the data comprising the device address code of the other wireless electronic device 2. For example the device address code of wireless electronic device 2 can be setup into the wireless electronic apparatus 3a either during the manufacture registering the 48-bit unique device address (BD_ADDR) and/or while receiving the data essential for the establishment of a new wireless connection between wireless electronic device 2 and the radio device 1 described later in FIGS. 4 and 5. The embodiment is not limited to these two methods allowing the wireless electronic apparatus 3a to receive wireless electronic devices 2's data. Any data operable to give access to address specified data can be used. Thus data which is sent to, received and processed by the wireless electronic device 2 is also received and processed by the wireless electronic apparatus 3a, although the data is addressed to wireless electronic device 2. Furthermore the wireless electronic apparatus 3a is not restricted to receiving data destined for wireless electronic device 2 but is also operable to send data via channel 51 personating as wireless electronic device 2. Thus, commands like increasing the volume, ring off, etc. can be send via the wireless electronic apparatus 3a via channel 51 to control the wireless electronic device 2. It is clear that wireless electronic device 2 is not limited to audio data streams but can accomplish also video data streams and other data known to a person skilled in the art. Moreover the radio device 1 is set as master for both the wireless electronic device 2 and the wireless electronic apparatus 3a. Moreover the wireless electronic device 2 is operable to process data streams like for example audio or video data, while the wireless electronic apparatus 3a is operable to process the data extracting status data and properties of the data streams. But of course, both devices are not limited to these processing formats as a skilled person realizes.

Figure 3:
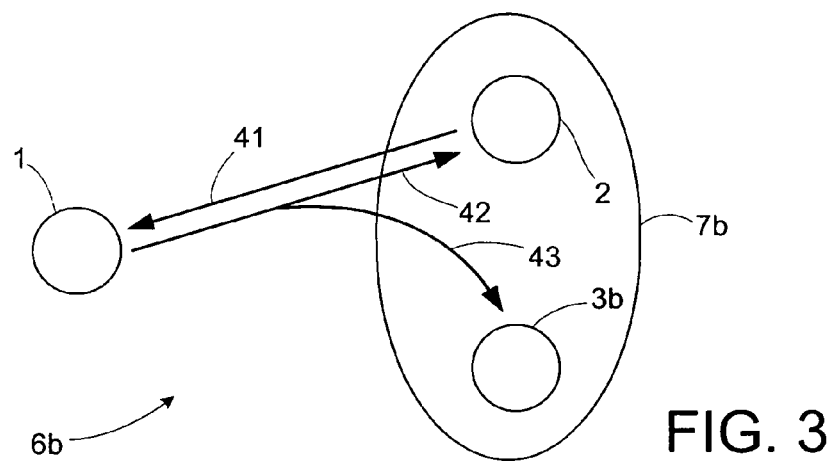
FIG. 3 shows a schematic view of another communication network comprising an alternative embodiment of the present invention.

FIG. 3 shows a schematic view of a Bluetooth communication network 6b comprising a wireless electronic system 7b, a radio device 1 and the wireless connection 4a. The wireless electronic system 7b is operable to form a connection with the radio device 1 and comprises the wireless electronic device 2 and the wireless electronic apparatus 3b, an alternative embodiment of the present invention. The wireless electronic device 2 and the wireless electronic apparatus 3b are operable to process and/or output data and to connect with the radio device 1 via the wireless connection 4a, respectively, which are established by electromagnetic waves. All shown devices, connections and channels are the same as described in FIG. 2. The wireless electronic apparatus 3b is setup and operable to receive data destined for wireless electronic device 2 in the same ways as explained in FIG. 2. Therefore no active connection establishment between the wireless electronic apparatus 3b and the radio device 1 is performed to save energy and active Bluetooth slave places.

Figure 4:
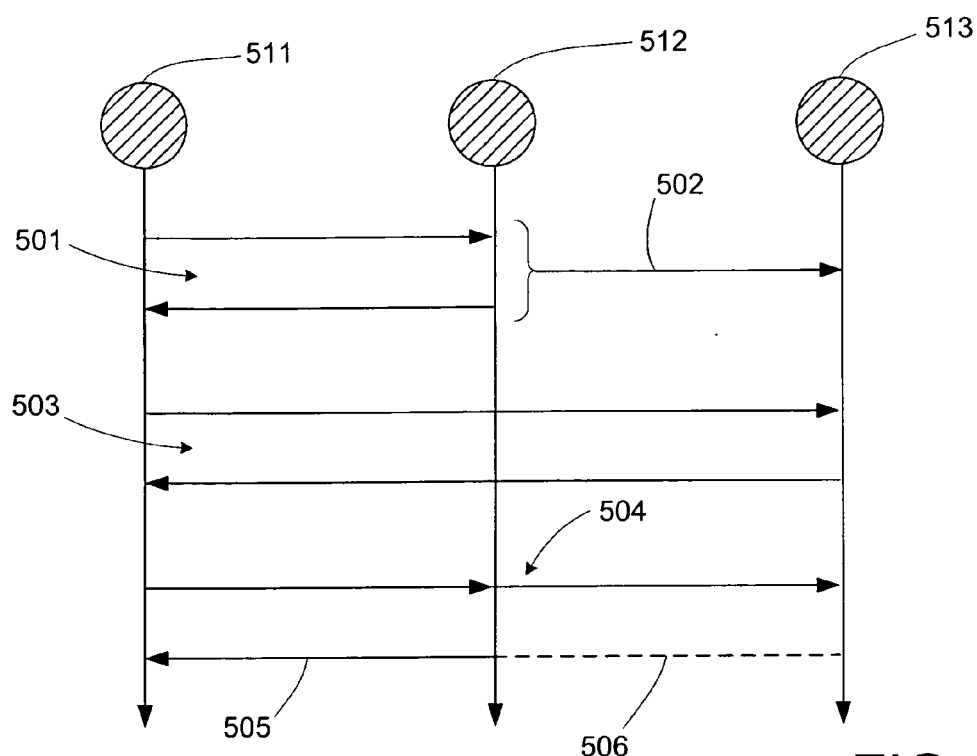
FIG. 4 shows an example of an initialization setup sequence of a communication network between a radio device and an embodiment of the present invention.

FIG. 4 shows an example of an initialization setup sequence of a Bluetooth communication network between a radio device 511, a wireless electronic device 512 and a wireless electronic apparatus 513, an embodiment of the present invention. All devices are the same as and correspond to the ones described in one of the FIG. 2 or 3.

This network comprises one master radio device 511 and two slave devices, in particular one main-slave device 512 as the wireless electronic device and one sub-slave device 513 as the wireless electronic apparatus. The main-slave device 512 is the same as the wireless electronic device 2 and the sub-slave device 513 is the same as the wireless electronic apparatus 3a or 3b.

In the initialization step 501 a wireless connection, which is provided by the channels 41 and 42 of FIG. 2 or 3, is established between the master radio device 511 and the main-slave device 512 wherein all typical and necessary parameters like the frequency hopping sequence, the clock offset, the device address and more are exchanged. Thereby the master radio device 511 is set as master and the main-slave device 512 as slave of the master radio device in return. From and/or during the step 501 the adaptation step 502 is processed providing the sub-slave device 513 with all the necessary data given by the master radio device 511 and/or the main-slave device 512 to make the sub-slave device 513 operable to filter and thus process data destined for the main-slave device 512. This data is provided by the channel 43 of FIG. 2 or 3. Optionally the sub-slave device 513 is operable to pose as main-slave device 512 as described later in step 506.

In step 503 a wireless connection, which is provided by the channels 51 and 52 of FIG. 2, is established between the master radio device 511 and the sub-slave device 513 wherein all typical and necessary parameters like the frequency hopping sequence, the clock offset, the device address and more are exchanged. Thereby the master radio device 511 is set as master of the sub-slave device 513 and the sub-slave device 513 as slave of the master radio device 511 in return. After the step 503 the network is established as described in the FIG. 2.

In reception step 504 data like for example commands and/or data streams destined for the main-slave device 512 are sent by the master radio device 511. This data is received concurrently by both the main-slave device 512 and the sub-slave device 513. While favorably the main-slave device 512 processes the data comprising for example streams like audio signals, the sub-slave device 513 processes the part of the data comprising for example packets like the properties of the streams and/or the master radio device 511 status informations like for example cell phone and/or radio status.

Afterwards the main-slave device 512 confirms the reception of the informations in step 505. In another case instead of the main-slave device 512, the sub-slave device 513 confirms the reception in step 506 by posing as the main-slave device 512 as described above.

In case of above-described FIG. 3 the steps 503 and 506 are not involved since the network 6b is only comprising the channels 41, 42 and 43.

Figure 5:
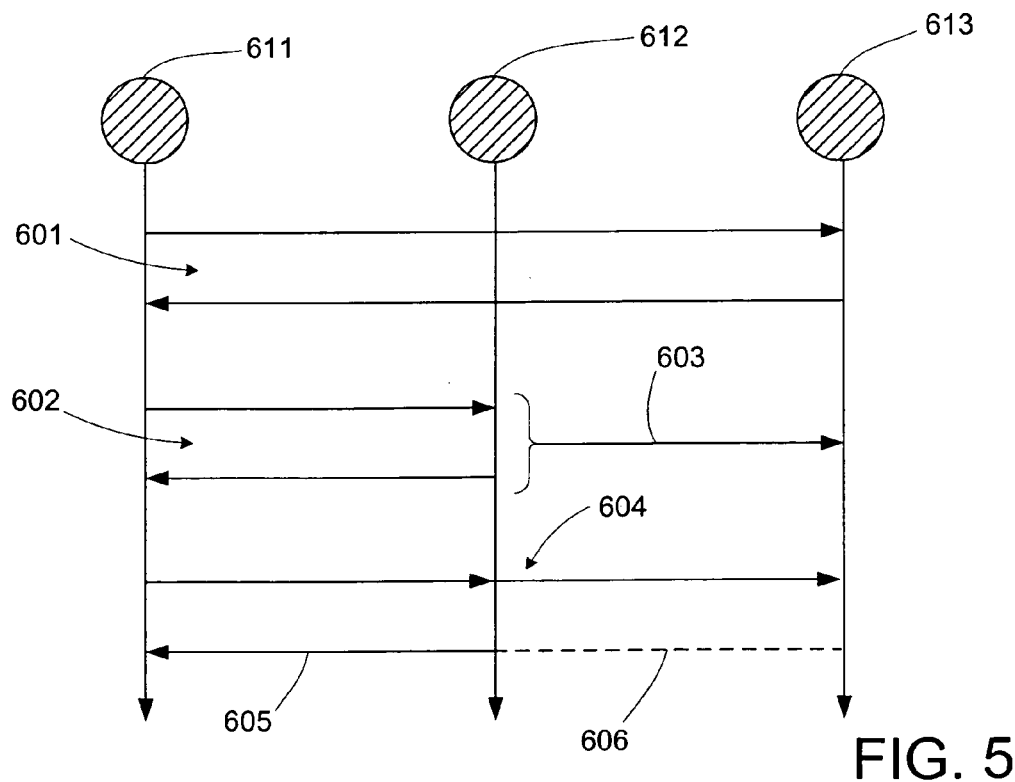
FIG. 5 shows another example of an initialization setup sequence of a communication network between a radio device and an alternative embodiment of the present invention.

FIG. 5 shows an alternative example of an initialization setup sequence of a Bluetooth communication network between a radio device 611, a wireless electronic device 612 and an embodiment of the present invention. All devices are the same as described in one of the FIG. 2 or 3.

This network comprises one master radio device 611 and two slave devices, in particular one main-slave device 612 as the wireless electronic device and one sub-slave device 613 as the wireless electronic apparatus. The main-slave device 612 is the same as the wireless electronic device 2 and the sub-slave device 613 is the same as the wireless electronic apparatus 3a or 3b.

In step 601 a wireless connection, which is provided by the channels 51 and 52 of FIG. 2, is established between the master radio device 611 and the sub-slave device 613 wherein all typical and necessary parameters like the frequency hopping sequence, the clock offset, the device address and more are exchanged. Thereby the master radio device 611 is set as master and the sub-slave device 613 as slave of the master radio device 611 in return.

In initialization step 602 a wireless connection, which is provided by the channels 41 and 42 of FIG. 2, is established between the master radio device 611 and the main-slave device 612 wherein all typical and necessary parameters like the frequency hopping sequence, the clock offset, the device address and more are exchanged. Thereby the master radio device 611 is set as master of the main-slave device 612 and the main-slave device 612 as slave of the master radio device 611 in return. From and/or during the step 602 the adaptation step 603 is processed providing the sub-slave device 613 with all the necessary data given by the master radio device 611 and/or the main-slave device 612 to make the sub-slave device 613 operable to filter and thus process data destined for the main-slave device 612. This data is provided by the channel 43 of FIG. 2 or 3. Optionally the sub-slave device 613 is operable to pose as main-slave device 612 as described later in step 606. After the step 603 the network is established as described in the FIG. 2.

In reception step 604 data like for example commands and/or data streams destined for the main-slave device 612 is sent by the master radio device 611. This data is received by both the main-slave device 612 and the sub-slave device 613. While favorably the main-slave device 612 processes the data comprising for example streams like audio signals, the sub-slave device 613 processes the data comprising for example packets like the properties of the streams or other master radio device 611 status informations like for example cell phone and/or radio status.

Afterwards the main-slave device 612 confirms the reception of the informations in step 605. On the other hand instead of main-slave device 612 the sub-slave device 613 confirms the reception in step 606 by posing as the main-slave device 612 as described above.

In case of above-described FIG. 3 the steps 601 and 606 are not involved since the network 6b is only comprising the channels 41, 42 and 43.

Figure 6:
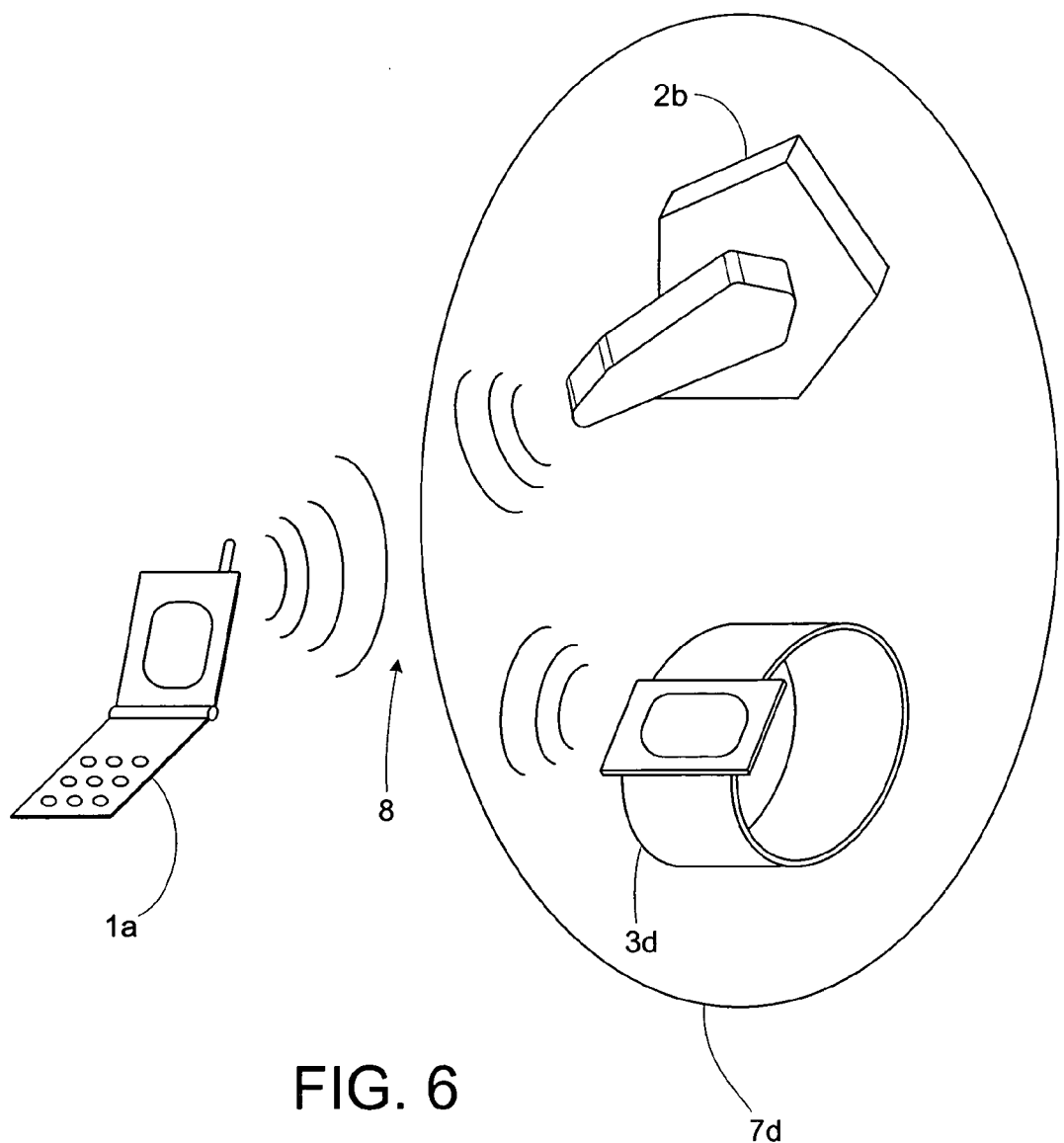
FIG. 6 shows an example of a composition of radio devices wherein a cell phone, a headset and an alternative embodiment of the present invention, comprising a wrist display, is shown.

FIG. 6 shows an example of a composition of radio devices wherein a cell phone 1a forms a Bluetooth communication network via electromagnetic waves 8 with an alternative embodiment of the present invention 7d which comprises a headset device 2b and a wrist display device 3d. The cell phone 1a is operable to transmit audio signals, the headset device 2b is operable to output audio signals and the wrist display device 3d is operable to display informations and/or properties regarding the audio signals and/or status informations of the cell phone 1a. These informations are not limited to audio signals and status informations.

The cell phone 1a is otherwise the same as the master radio device and the headset device 2b and the wrist display device 3d are otherwise the same as the main-slave device and the sub-slave device, respectively, as described in one of the FIGS. 2 to 6.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A wireless electronic apparatus for Bluetooth communication in a Bluetooth network comprising:
    a Bluetooth receiver that receives data specifically addressed to said wireless electronic apparatus and to a wireless electronic device for Bluetooth communication, said specifically addressed data comprising a device address code of said wireless electronic device which is different from an address code of said wireless electronic apparatus, said wireless electronic device comprising a receiver for receiving data specifically addressed to said wireless electronic device, the Bluetooth receiver being configured to receive the device address code of said wireless electronic device during manufacture of the electronic apparatus or from the wireless electronic device or a radio device while the network is formed;
    a Bluetooth transmitter for transmitting data, said wireless electronic apparatus operable based on the received device address code to personate as said wireless electronic device when transmitting data so as to appear to a receiving device as originating from said wireless electronic device, said wireless electronic apparatus being different from said wireless electronic device.

2. A wireless electronic apparatus for Bluetooth communication according to claim 1, wherein the Bluetooth transmitter is configured to send data specifically addressed as said wireless electronic apparatus or as said wireless electronic device for Bluetooth communication.

3. A wireless electronic system for Bluetooth communication forming a Bluetooth network with a radio device comprising a transmitter for transmitting and a receiver for receiving specifically addressed data, said system comprising
    a wireless electronic device which receives and transmits specifically addressed data, wherein said wireless electronic device comprises a Bluetooth receiver that receives said data, said data being specifically addressed to said wireless electronic device and comprising a device address code of said wireless electronic device, and
    a wireless electronic apparatus according to claim 1.

4. A wireless electronic system for Bluetooth communication according to claim 3, wherein the Bluetooth transmitter of the wireless electronic apparatus is configured to transmit data specifically addressed as said wireless electronic apparatus or as said wireless electronic device.

5. A wireless electronic system for Bluetooth communication according to claim 3, wherein the wireless electronic device transmits specifically addressed data to said radio device.

6. A wireless electronic system for Bluetooth communication according to claim 3, wherein the wireless electronic device and the wireless electronic apparatus each further comprises a processor to process data streams and/or data packets, respectively.

7. A wireless electronic system for Bluetooth communication according to claim 3, wherein the wireless electronic device and the wireless electronic apparatus are spatially separated.

8. A wireless electronic system for Bluetooth communication according to claim 3, wherein the wireless electronic apparatus is provided the device address code of the wireless electronic device while the network is formed, said device address code for receiving data specifically addressed to the wireless electronic device.

9. A method for receiving data by a wireless electronic apparatus for Bluetooth communication from a radio device, said wireless electronic apparatus comprising a transmitter for transmitting and a receiver for receiving data, wherein the data is specifically addressed to a wireless electronic device for Bluetooth communication, said specifically addressed data comprising a device address code of said wireless electronic device which is different from an address code of said wireless electronic apparatus, said wireless electronic device comprising a receiver for receiving data, said wireless electronic apparatus being different from said wireless electronic device,
    said wireless electronic apparatus comprising a receiver that receives said data in parallel with said receiver of said wireless electronic device, said data being specifically addressed to said wireless electronic device and comprising said device address code of said wireless electronic device,
    the method comprising:
    an initialization step, wherein the wireless electronic device connects to the radio device via an active Bluetooth connection, whereby an active device address is given from the radio device to the wireless electronic device, said active device address allowing the reception of specifically addressed data,
    an adaptation step, wherein the wireless electronic apparatus receives the active device address from or during the initialization step to make the wireless electronic apparatus operable to receive and process data destined for the wireless electronic device, and
    a reception step, wherein the wireless electronic apparatus receives data specifically addressed to the wireless electronic device.

10. A wireless electronic apparatus according to claim 1, wherein said Bluetooth receiver of said wireless electronic apparatus receives said data comprising said device address code of said wireless electronic device in parallel with said receiver of said wireless electronic device.

11. A method of claim 9, comprising transmitting data, by said wireless electronic apparatus, to said radio device, the wireless electronic apparatus personating as said wireless electronic device when transmitting data so as to appear to said radio device as originating from said wireless electronic device.

* * * * *